United States Patent
Rhoads (10) Patent No.: US 6,749,170 B1
(45) Date of Patent: Jun. 15, 2004

(54) BOW HOLDER APPARATUS

(76) Inventor: Randall Rhoads, 15431 Clearwater Point Rd., Williamsburg, MI (US) 49690

( * ) Notice: Subject to any disclaimer, the term of this patent is extended or adjusted under 35 U.S.C. 154(b) by 0 days.

(21) Appl. No.: 10/372,682

(22) Filed: Feb. 21, 2003

(51) Int. Cl.⁷ .............................................. F16M 13/00
(52) U.S. Cl. ......................... 248/545; 124/86; 124/89; 248/156; 248/688
(58) Field of Search ................................. 248/156, 545, 248/688, 533, 309.1; 124/88, 89, 86

(56) References Cited

U.S. PATENT DOCUMENTS

| | | | | |
|---|---|---|---|---|
| D100,600 S | * | 7/1936 | Luff | D22/147 |
| 4,531,643 A | * | 7/1985 | Bradley | 211/64 |
| 5,205,272 A | * | 4/1993 | Boyer | 124/89 |
| 5,377,657 A | * | 1/1995 | Foster et al. | 124/86 |
| 2002/0066446 A1 | * | 6/2002 | Kesti | |
| 2002/0066759 A1 | * | 6/2002 | Oxley | |

* cited by examiner

*Primary Examiner*—Ramon O Ramirez

(57) ABSTRACT

A bow holder apparatus includes a bow holder unit which includes a top holder member portion and a bottom holder member portion. The top holder member portion includes a front holder portion, a middle holder portion, and a rear holder portion. The bottom holder member portion includes connector receivers. Holder-to-support interface means are received in the connector receivers for connecting the bow holder unit to an underlying support that can be either the ground or an elevated structure, such as a tree stand. For the ground-penetration mode, the holder-to-support interface means include top stake portions which are connected to ground-penetration bottom stake portions of ground stake members. For the tree-stand-support mode, the holder-to-support interface means include a bolt head portion of a first connector bolt which is connected to a support panel which is connected to a tree stand.

15 Claims, 6 Drawing Sheets

BOW HOLDER APPARATUS

BACKGROUND OF THE INVENTION

1. Field of the Invention

The present invention relates generally to bow holders and, more particularly, to bow holders especially adapted for supporting a bow in an upright orientation.

2. Description of the Prior Art

The use of bow holders to support a bow in an upright orientation is well known in the art. When an archer wants to stop holding a bow, it is often desirable to rest the bow in a bow holder so that the bow is retained in an upright orientation. When the bow is retained in the upright orientation, the archer can rapidly reacquire the bow and rapidly use the bow.

Generally, when a bow is retained in a bow holder, the bow is retained either on the ground or in a elevated location. In this respect, throughout the years, a number of innovations have been developed relating to bow holders, and the following U.S. patents are representative of some of those innovations: U.S. Pat. Nos. 4,846,140, 4,896,854, 5,039,052, 5,111,800, and 5,183,231. More specifically, U.S. Pat. No. 4,846,140 discloses a spike stand for archery bows in which the spike stand is clamped onto the bow. To support the bow in the ground, the spike portion is turned toward the ground and is pushed into the ground. On the other hand, when the bow is being used, the spike portion is pulled out from the ground and is turned away from the ground. Rather than pulling a spike out of the ground when the bow is being used, it would be desirable to leave the spike and the bow holder in contact with the ground and simply remove the bow from the bow holder to use the bow.

U.S. Pat. No. 4,896,854 discloses a bow holder which permits a bow to be held in an upright orientation when the bow holder is supported either by the ground or by a hunting seat. For support in the ground, a peg is employed, and the peg has a head which includes a bolt reception channel. Providing a bolt reception channel in the head of a ground penetration peg inevitably weakens the head of peg. To avoid such a weakening of the head of a ground penetration member, it would be desirable if a ground penetration member were provided which does not have a bolt reception channel in the head of the ground penetration member. U.S. Pat. No. 5,039,052 discloses a portable bow holder that can be supported either in the ground or on an elevated support. In either case, a portion of the bow holder is clamped onto the bow, so that the bow carries that clamped on portion, even when the bow is in use. As stated hereinabove, it would be desirable not to have a portion of a bow support to be clamped onto the bow. Moreover, the ground penetration portion has a head which receives an attachment bolt. Also, as stated hereinabove, it would be desirable if a ground penetration member does not have a bolt reception channel in the head of the ground penetration member.

U.S. Pat. No. 5,111,800 discloses another bow holder that includes a ground penetration member that has a head which receives an attachment bolt, and a reason for the undesirability of this feature is stated hereinabove.

U.S. Pat. No. 5,183,231 discloses a bow holder which may be supported either by the ground or a tree stand. A ground penetration member and a related member are arranged in a telescopic relationship. If dirt enters between two telescopic members, the dirt can cause excessive wear between the telescopic members. In this respect, it would be desirable if a bow holder has a ground penetration member that does not employ telescopic members.

Still other features would be desirable in a bow holder apparatus. For example, since both a ground-penetration mode and a tree-stand-support mode have distinct advantages at different times, it would be desirable if a bow holder apparatus could easily be interconverted between a ground-penetration mode and a tree-stand-support mode.

When a bow is supported by a bow holder, the bow is often supported in an orientation so that when the archer returns to the bow, the bow is at a proper orientation for shooting. When a bow is supported by a bow holder on the ground, the bow support orientation would be different from when a bow is supported by a bow holder in a tree stand. In this respect, it would be desirable if the angular orientation of a bow holder could be readily adjusted by a user.

Thus, while the foregoing body of prior art indicates it to be well known to use a bow holder, the prior art described above does not teach or suggest a bow holder apparatus which has the following combination of desirable features: (1) permits a spike and a bow holder to remain in contact with the ground and permits the bow to be simply removed from the bow holder to use the bow; (2) provides a ground penetration member which does not have a bolt reception channel in the head of the ground penetration member; (3) has a ground penetration member that does not employ telescopic members; (4) can easily be interconverted between a ground-penetration mode and a tree-stand-support mode; and (5) provides that the angular orientation of a bow holder can be readily adjusted by a user. The foregoing desired characteristics are provided by the unique bow holder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a bow holder apparatus which includes a bow holder unit which includes a top holder member portion and a bottom holder member portion. The top holder member portion includes a front holder portion, a middle holder portion, and a rear holder portion. The bottom holder member portion includes connector receivers. Holder-to-support interface means are received in the connector receivers for connecting the bow holder unit to an underlying support that can be either the ground or an elevated structure, such as a tree stand.

For the ground-penetration mode, the holder-to-support interface means include top stake portions which are connected to ground-penetration bottom stake portions of ground stake members. The underlying support is the ground. By using the bow holder apparatus of the invention in the ground-penetration mode, an archer can keep one's bow off of the ground when the bow is not in use. This prevents the bow from being wetted or dirtied by the ground. Moreover, when a bow is installed on the bow holder apparatus, the bow will be ready to shoot an arrow without noisy and time-consuming setup of bow and arrow.

Preferably, the bow holder unit includes a pair of complimentary bow holder unit half members which include a first bow holder unit half member and a second bow holder unit half member. Each of the first bow holder unit half member and the second bow holder unit half member includes a respective front holder portion, a middle holder portion, a rear holder portion, a bottom holder member portion, and plural connector receivers.

The first bow holder unit half member includes fastener engagement wells, and the second bow holder unit half member includes fastener reception channels. Fasteners, such as screws, are received in the fastener reception channels and the fastener engagement wells for securing the first bow holder unit half member to the second bow holder unit half member.

Preferably, the front holder portion of the first bow holder unit half member is spaced apart from the front holder portion of the second bow holder unit half member by a string-reception space. When a bow is placed on the bow holder unit, the string or strings of the bow enter the string-reception space. The bow can be a compound bow. Alternatively, the bow can be a single-string bow.

For each of the first bow holder unit half member and the second bow holder unit half member, the respective front holder portion, the respective middle holder portion, and the respective rear holder portion are aligned along a respective alignment line. The ground stake members are arrayed along a line parallel to the alignment lines.

Each of the front holder portions includes a respective front inner holder wall which is tilted with respect to the alignment lines at a tilt angle. Each of the front inner holder walls includes a fulcrum bump.

Each of the rear holder portions includes a respective rear inner holder wall which is alignment with a respective fulcrum bump.

The holder-to-support interface means include a bolt head portion of a first connector bolt, and the underlying support includes elevated support attachment means attached to an elevated support.

The elevated support attachment means can include a support panel which is connected to the first connector bolt. The first connector bolt passes through a first bolt reception channel in the support panel. A first nut is provided for connection with a threaded end of the first connector bolt for securing the support panel to the bow holder unit.

A second connector bolt is threaded through a second bolt reception channel in the support panel. A clamping plate includes a bolt reception channel through which a portion of the second connector bolt passes through, and a second nut is provided for attachment to a threaded end of the second connector bolt.

An orientation angle adjustment wedge is positioned between the bow holder unit and the support panel. The orientation angle adjustment wedge includes an internal adjustment slot. The first connector bolt passes through the internal adjustment slot at a selected position along the internal adjustment slot.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bow holder apparatus which has all of the advantages of the prior art and none of the disadvantages.

It is another object of the present invention to provide a new and improved bow holder apparatus which may be easily and efficiently manufactured and marketed.

It is a further object of the present invention to provide a new and improved bow holder apparatus which is of durable and reliable construction.

An even further object of the present invention is to provide a new and improved bow holder apparatus which is susceptible of a low cost of manufacture with regard to both materials and labor, and which accordingly is then susceptible of low prices of sale to the consuming public, thereby making such bow holder apparatus available to the buying public.

Still yet a further object of the present invention is to provide a new and improved bow holder apparatus which permits a spike and a bow holder to remain in contact with the ground and permits the bow to be simply removed from the bow holder to use the bow.

Still another object of the present invention is to provide a new and improved bow holder apparatus that provides a ground penetration member which does not have a bolt reception channel in the head of the ground penetration member.

Yet another object of the present invention is to provide a new and improved bow holder apparatus which has a ground penetration member that does not employ telescopic members.

Even another object of the present invention is to provide a new and improved bow holder apparatus that can easily be interconverted between a ground-penetration mode and a tree-stand-support mode.

Still a further object of the present invention is to provide a new and improved bow holder apparatus which provides that the angular orientation of a bow holder can be readily adjusted by a user.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved bow holder apparatus embodying the principles and concepts of the present invention will be described.

Turning to FIGS. 1–7, there is shown a first embodiment of the bow holder apparatus of the invention generally designated by reference numeral 10. In the first embodiment, bow holder apparatus 10 includes a bow holder unit 12 which includes a top holder member portion 16 and a bottom holder member portion 14. The top holder member portion 16 includes a front holder portion 18, a middle holder portion 20, and a rear holder portion 22. The bottom holder member portion 14 includes connector receivers 27. Holder-to-support interface means are received in the connector receivers 27 for connecting the bow holder unit 12 to an underlying support that can be either the ground 38 or a tree stand 48.

For the ground-penetration mode, shown in FIGS. 1–5, the holder-to-support interface means include top stake portions 26 which are connected to ground-penetration bottom stake portions 24 of ground stake members 25. The underlying support is the ground 38. By using the bow holder apparatus 10 of the invention in the ground-penetration mode, an archer can keep one's bow off of the ground 38 when the bow is not in use. This prevents the bow from being wetted or dirtied by the ground 38. Moreover, when a bow 40 is installed on the bow holder apparatus 10, the bow will be ready to shoot an arrow without noisy and time-consuming setup of bow and arrow.

Preferably, the bow holder unit 12 includes a pair of complimentary bow holder unit half members which include a first bow holder unit half member 56 and a second bow holder unit half member 58. Each of the first bow holder unit half member 56 and the second bow holder unit half member 58 includes a respective front holder portion 18, a middle holder portion 20, a rear holder portion 22, a bottom holder member portion 14, and plural connector receivers 27.

The first bow holder unit half member 56 includes fastener engagement wells 62, and the second bow holder unit half member 58 includes fastener reception channels 60. Fasteners 64 are received in the fastener reception channels 60 and the fastener engagement wells 62 for securing the first bow holder unit half member 56 to the second bow holder unit half member 58.

Figure 5:
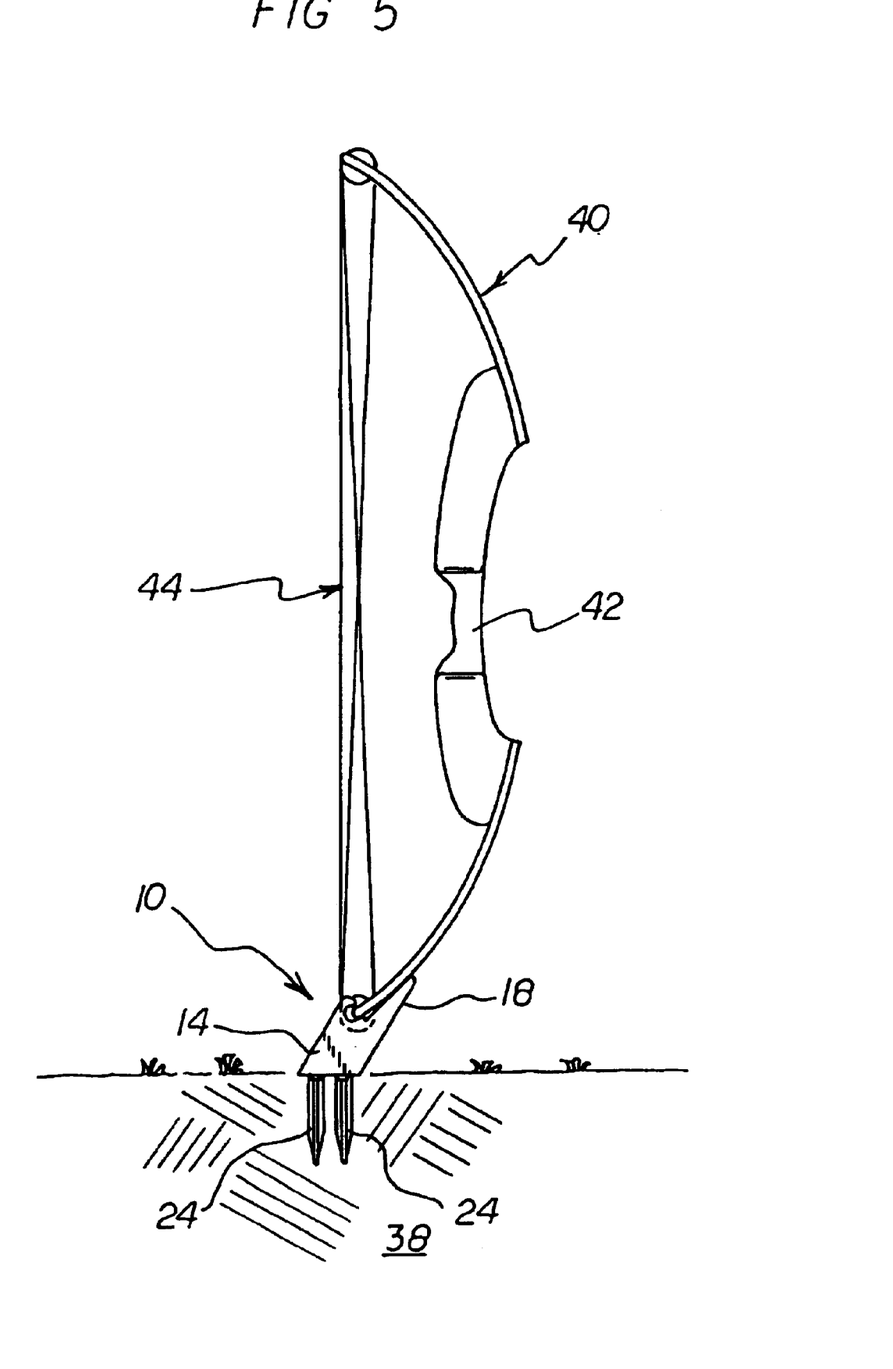
FIG. 5 is a side view of the first embodiment of the invention, supported by the ground and supporting a compound bow.

Preferably, the front holder portion 18 of the first bow holder unit half member 56 is spaced apart from the front holder portion 18 of the second bow holder unit half member 58 by a string-reception space 23. When a bow 40 is placed on the bow holder unit 12, the string or strings 44 of the bow 40 enter the string-reception space 23. As shown in FIG. 5, the bow 40 can be a compound 40. Alternatively, the bow 40 can be a single-string bow.

For each of the first bow holder unit half member 56 and the second bow holder unit half member 58, the respective front holder portion 18, the respective middle holder portion 20, and the respective rear holder portion 22 are aligned along a respective alignment line 28. The ground stake members 24 are arrayed along a line parallel to the alignment lines 28.

Each of the front holder portions 18 includes a respective front inner holder wall 30 which is tilted with respect to the alignment lines 28 at a tilt angle 32. Each of the front inner holder walls 30 includes a fulcrum bump 34.

Each of the rear holder portions 22 includes a respective rear inner holder wall 36 which is alignment with a respective fulcrum bump 34.

Figures 6, 7:
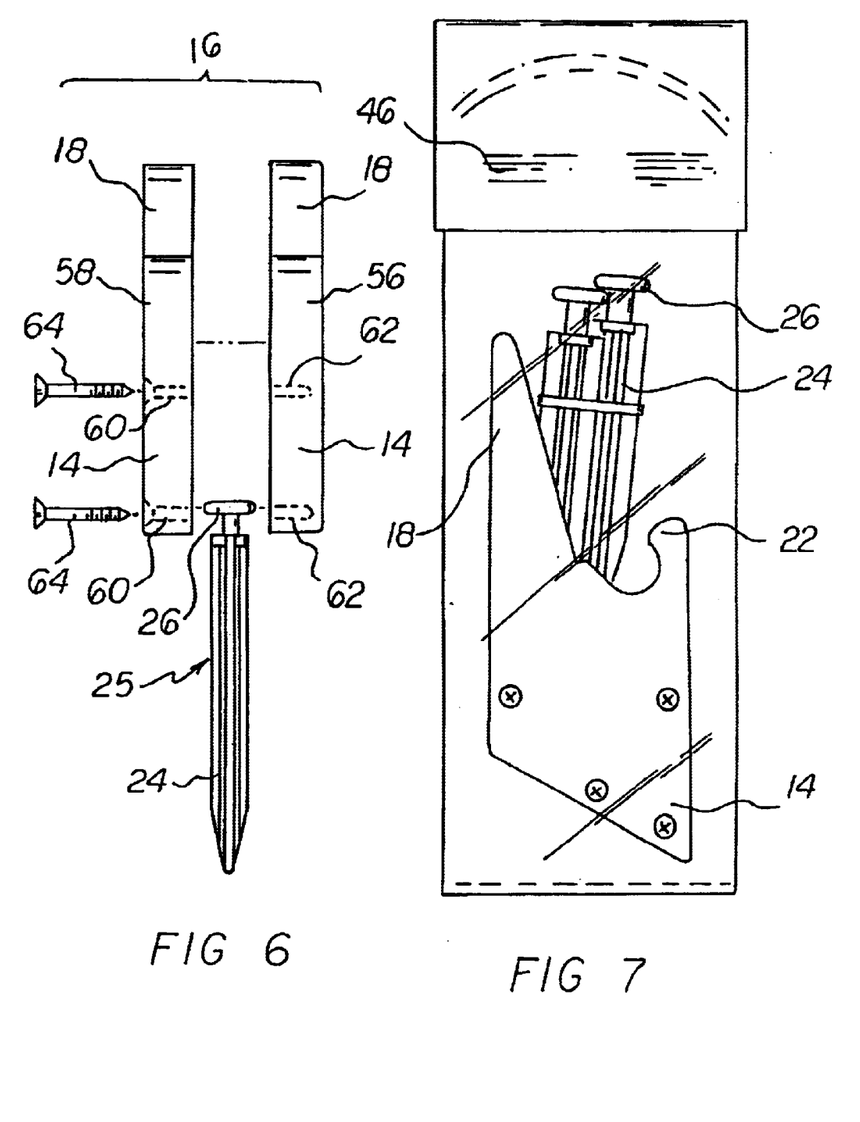
FIG. 6 is an exploded rear view of the first embodiment of the invention.
FIG. 7 is a store display package which contains the first embodiment of the invention.

As shown in FIG. 7, the bow holder apparatus 10 of the invention can be packaged as a kit, i.e. in unassembled form in a conveniently compact sized, store display package 46.

Figure 8:
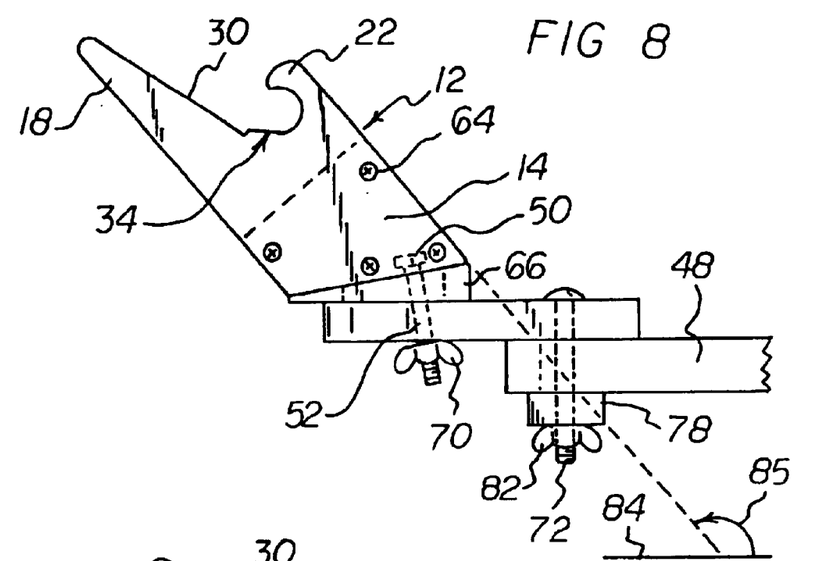
FIG. 8 is a side view of a second embodiment of the invention which is supported by a tree stand with a maximum outward tilt.
Figure 9:
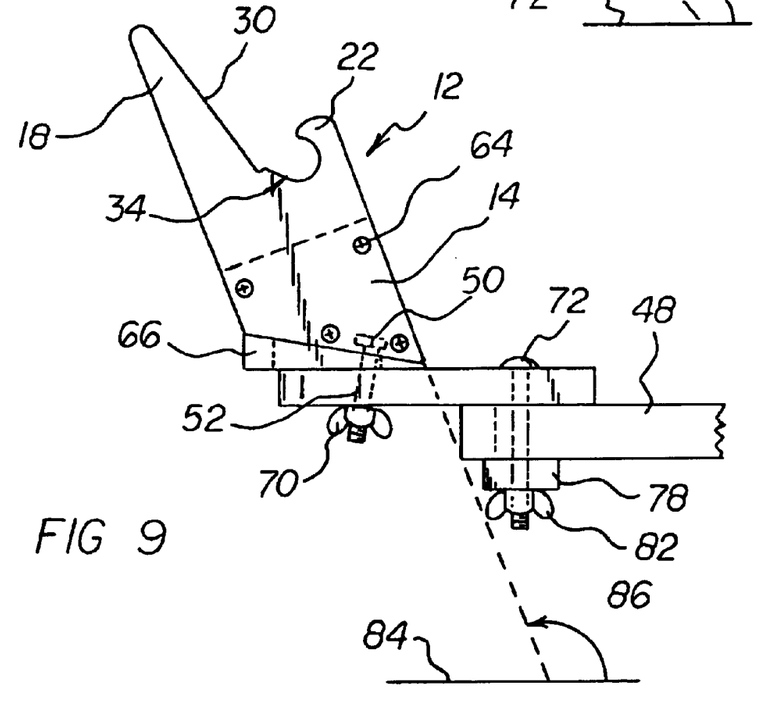
FIG. 9 is a side view of the second embodiment of the invention which is supported by a tree stand with a minimum outward tilt.
Figure 10:
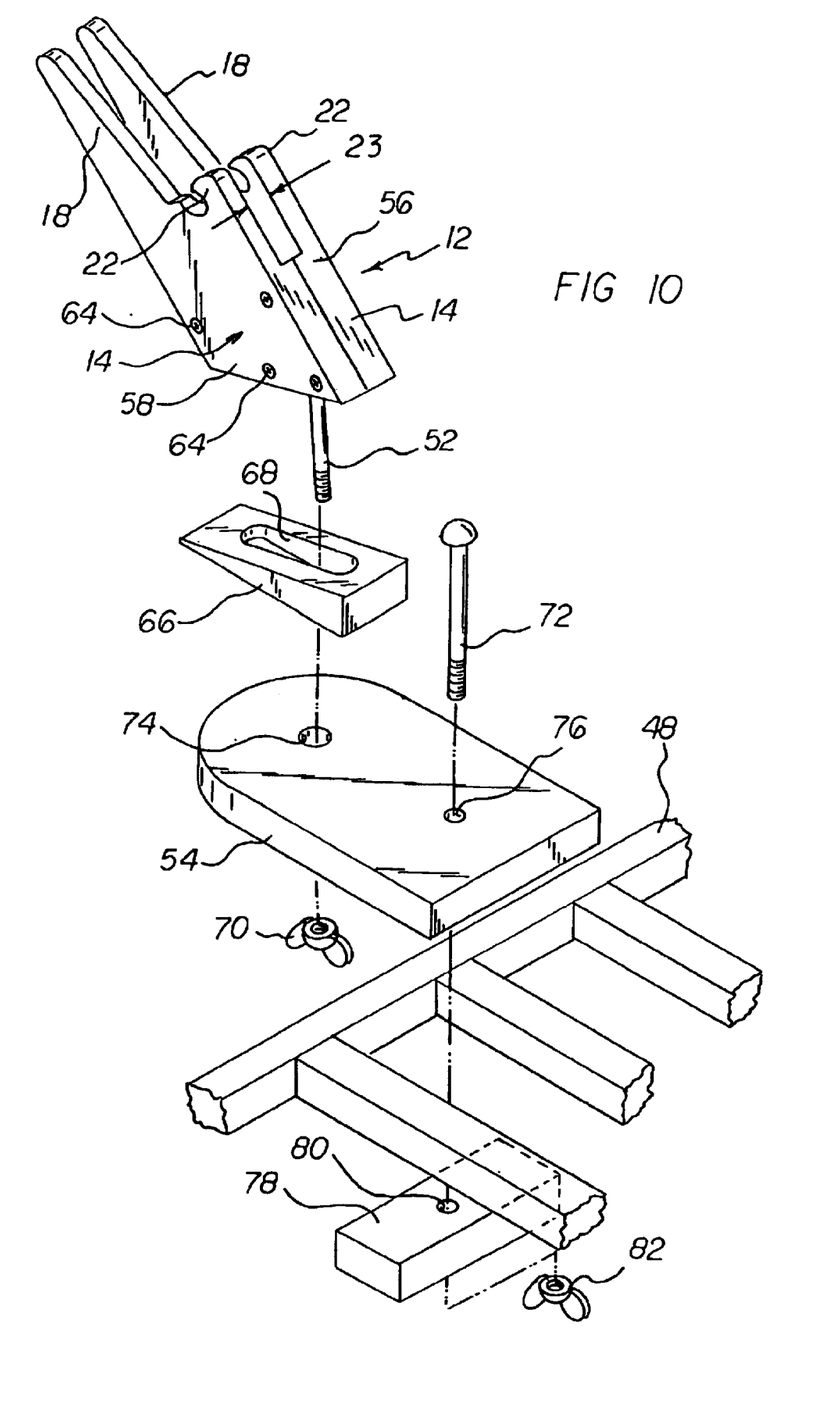
FIG. 10 is an exploded perspective view of the embodiment of the invention shown in FIG. 8.

Turning to FIGS. 8–10, a second embodiment of the invention is shown. Reference numerals are shown that correspond to like reference numerals that designate like elements shown in the other figures. In addition, the holder-to-support interface means include a bolt head portion 50 of a first connector bolt 52, and the underlying support includes elevated support attachment means attached to an elevated support.

The elevated support attachment means can include a support panel 54 which is connected to the first connector bolt 52. The first connector bolt 52 passes through a first bolt reception channel 74 in the support panel 54. A first nut 70 is provided for connection with a threaded end of the first connector bolt 52 for securing the support panel 54 to the bow holder unit 12.

A second connector bolt 72 is threaded through a second bolt reception channel 76 in the support panel 54. A clamping plate 78 includes a bolt reception channel 80 through which a portion of the second connector bolt 72 passes through, and a second nut 82 is provided for attachment to a threaded end of the second connector bolt 72.

An orientation angle adjustment wedge 66 positioned between the bow holder unit 12 and the support panel 54. The orientation angle adjustment wedge 66 includes an internal adjustment slot 68. The first connector bolt 52 passes through the internal adjustment slot 68 at a selected position along the internal adjustment slot 68.

Figures 1, 2:
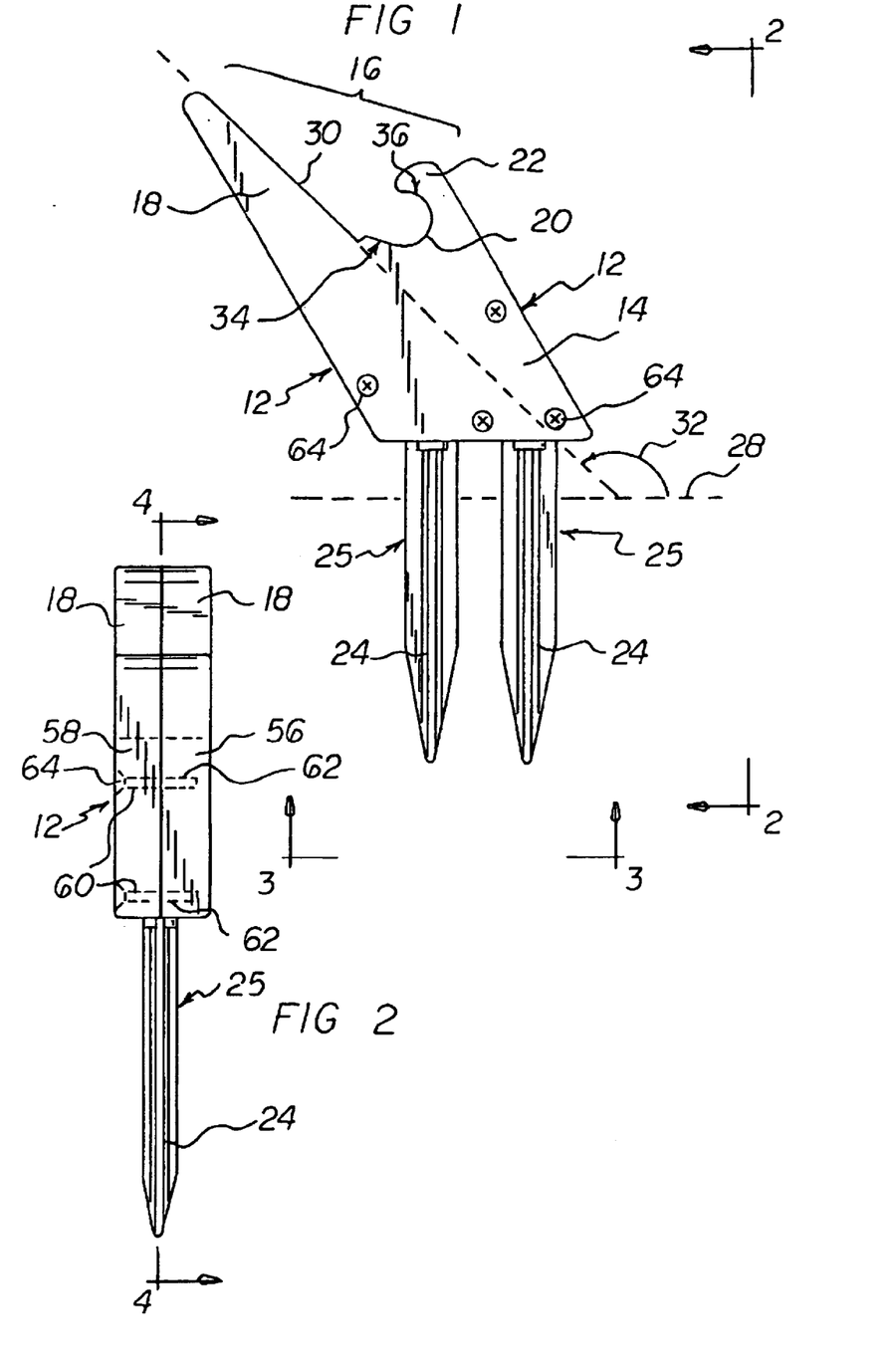
FIG. 1 is a side view showing a first embodiment of the bow holder apparatus of the invention, being supported by the ground.
FIG. 2 is a rear view of the embodiment of the bow holder apparatus shown in FIG. 1 taken along line 2—2 of FIG. 1.
Figure 3:
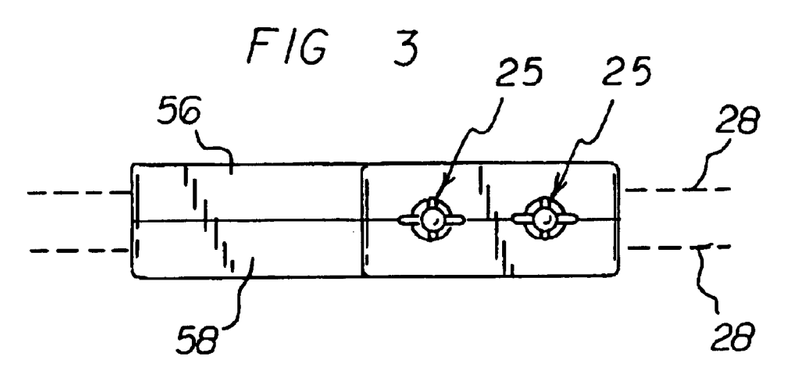
FIG. 3 is a bottom view of the embodiment of the bow holder apparatus of FIG. 1 taken along line 3—3 thereof.
Figure 4:
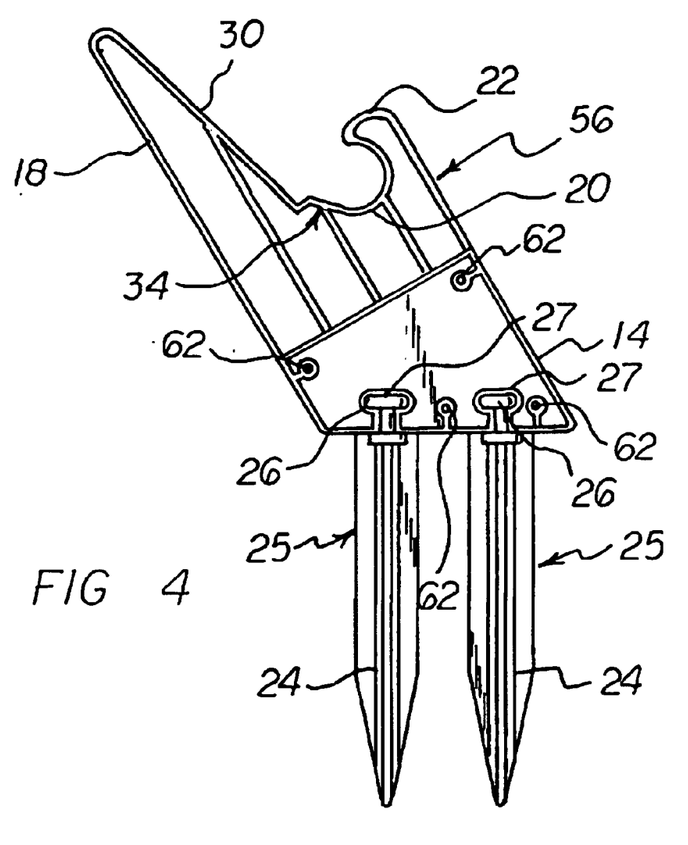
FIG. 4 is a cross-sectional view of the embodiment of the invention shown in FIG. 2, taken along line 4—4 thereof.

To use the bow holder apparatus 10 of the invention in the ground-penetration mode, the fasteners 64 (such as screws 64) are unscrewed from the first bow holder unit half member 56 and removed from the first bow holder unit half member 56 and the second bow holder unit half member 58. Then, the first bow holder unit half member 56 and the second bow holder unit half member 58 are separated from each other, as shown in FIGS. 4 and 6. Then, first halves of the top stake portions 26 of the ground stake members 25 are placed in the complimentary connector receivers 27 in the bottom holder member portions 14 of the first bow holder unit half member 56. Then, the second bow holder unit half member 58 is placed in registration with the second bow holder unit half member 58. When this is done, second halves of the top stake portions 26 enter the connector receivers 27 in the second bow holder unit half member 58. Then, the fasteners 64 are refastened to the first bow holder unit half member 56 so that the first bow holder unit half member 56 and the second bow holder unit half member 58 are secured tightly together with the top stake portions 26 firmly fixed in the connector receivers 27, thereby being firmly fixed in the bow holder unit 12.

Then, as shown in FIG. 5, the ground-penetration bottom stake portions 24 of the ground stake members 25 are pushed into the ground 38. The orientation angle at which the ground stake members 25 are pushed into the ground is determined by the archer so that the bow 40 is oriented in an upright orientation when the bow 40 is placed on the bow holder apparatus 10. Then, the bow 40 can readily be placed upon the bow holder unit 12 for holding the bow 40 when it is not in use by an archer.

When the archer is ready to use the bow 40, the archer has two choices. The archer can leave the bow 40 in the bow holder unit 12, and the archer can place an arrow in contact with the string 44, hold onto the bow handle 42, and fire the arrow from the bow 40 as it rests in the bow holder unit 12. Alternatively, the archer can lift the bow 40 out of the bow holder unit 12 and use the bow 40 in a conventional way.

To use the bow holder apparatus 10 in the tree-stand-support mode, with reference to FIGS. 8–10, the archer first makes sure the ground stake members 25 are removed from the bow holder unit 12. To do so, the archer unscrews the fasteners 64, removes the fasteners 64 from the bow holder unit 12, separates the second bow holder unit half member 58 from the first bow holder unit half member 56, and slides the top stake portion 26 of the ground stake members 25 out from the connector receivers 27.

Then, the archer places the bolt head portion 50 of the first connector bolt 52 into one of the connector receivers 27, preferably the rearmost connector receiver 27, and places the first bow holder unit half member 56 back in registration with the second bow holder unit half member 58. Then, the archer reinstalls the fasteners 64 to secure the first connector bolt 52 in the bow holder unit 12 between the securely connected first bow holder unit half member 56 and second bow holder unit half member 58.

Then, the archer grasps the orientation angle adjustment wedge 66 and moves the first connector bolt 52 through the internal adjustment slot 68 of the orientation angle adjustment wedge 66. Then, the archer threads the first connector bolt 52 through the first bolt reception channel 74 in the support panel 54. Then, the first nut 70 is screwed onto the threaded end of the first connector bolt 52 to secure the bow holder unit 12 and the orientation angle adjustment wedge 66 to the support panel 54.

Then, the second connector bolt 72 is threaded through the second bolt reception channel 76 in the support panel 54. The clamping plate 78 is placed under a portion of the tree stand 48, as shown in FIG. 10, and the second nut 82 is screwed onto the threaded end of the second connector bolt 72. When the second nut 82 is tightened on the second connector bolt 72, the portion of the tree stand 48 is clamped tightly between the support panel 54 and the clamping plate 78. In this way, the bow holder apparatus 10 of the invention is affixed to and supported by the tree stand 48.

The orientation of the bow 40, when placed in the bow holder unit 12, is determined by the positioning of the orientation angle adjustment wedge 66 between the bow holder unit 12 and the support panel 54. When the tall end of the orientation angle adjustment wedge 66 is placed proximal to the second connector bolt 72, as shown in FIG. 8, the orientation angle 85 between the rear side of the bow holder unit 12 and the horizontal line 84 is a greater angle than orientation angle 86 between the rear side of the bow holder unit 12 and the horizontal line 84 when the tall end of the orientation angle adjustment wedge 66 is placed distal to the second connector bolt 72, as shown in FIG. 9. In this respect, the positioning of the orientation angle adjustment wedge 66 can determine the orientation angle between the rear of the bow holder unit 12 and a horizontal line 84.

When the tree-stand-support mode of the bow holder apparatus 10 of the invention is no longer needed, the components of this embodiment of the invention can be disassembled and placed in storage, such as in a storage bag, until further use.

The components of the bow holder apparatus of the invention can be made from inexpensive and durable metal and plastic materials.

As to the manner of usage and operation of the instant invention, the same is apparent from the above disclosure, and accordingly, no further. discussion relative to the manner of usage and operation need be provided.

It is apparent from the above that the present invention accomplishes all of the objects set forth by providing a new and improved bow holder apparatus that is low in cost, relatively simple in design and operation, and which may advantageously be used to permit a spike and a bow holder to remain in contact with the ground and to permit the bow to be simply removed from the bow holder to use the bow. With the invention, a bow holder apparatus provides a ground penetration member which does not have a bolt reception channel in the head of the ground penetration member. With the invention, a bow holder apparatus is provided which has a ground penetration member that does not employ telescopic members. With the invention, a bow holder apparatus is provided which can easily be interconverted between a ground-penetration mode and a tree-stand-support mode. With the invention, a bow holder apparatus provides that the angular orientation of a bow holder can be readily adjusted by a user.

Thus, while the present invention has. been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A bow holder apparatus, comprising:
   a bow holder unit which includes a top holder member portion and a bottom holder member portion, wherein said top holder member portion includes a front holder portion, a middle holder portion, and a rear holder portion, and wherein said bottom holder member portion includes connector receivers, and holder-to-support interface means, received in said connector receivers, for connecting said bow holder unit to an underlying support that can be either the ground or a support panel connected to a tree stand, wherein said bow holder unit includes a pair of complimentary bow holder unit half members which includes a first bow holder unit half member and a second bow holder unit half member.

2. The apparatus of claim 1 wherein:

said holder-to-support interface means include top stake portions which are connected to ground-penetration bottom stake portions of ground stake members, and the underlying support is the ground.

3. The apparatus of claim 1 wherein each of said first bow holder unit half member and said second bow holder unit half member includes a respective front holder portion, a middle holder portion, a rear holder portion, a bottom holder member portion, and plural connector receivers.

4. The apparatus of claim 3 wherein:

said first bow holder unit half member includes fastener engagement wells, and said second bow holder unit half member includes fastener reception channels.

5. The apparatus of claim 4, further including:

fasteners received in said fastener reception channels and said fastener engagement wells for securing said first bow holder unit half member to said second bow holder unit half member.

6. The apparatus of claim 3 wherein said front holder portion of said first bow holder unit half member is spaced apart from said front holder portion of said second bow holder unit half member by a string-reception space.

7. The apparatus of claim 3 wherein for each of said first bow holder unit half member and said second bow holder unit half member, said respective front holder portion, said respective middle holder portion, and said respective rear holder portion are aligned along a respective alignment line.

8. The apparatus of claim 7 wherein said ground stake members are arrayed along a line parallel to said alignment lines.

9. The apparatus of claim 7 wherein each of said front holder portions includes a respective front inner holder wall which is tilted with respect to said alignment lines at an acute tilt angle.

10. The apparatus of claim 7 wherein each of said front inner holder walls includes a fulcrum bump.

11. The apparatus of claim 10 wherein each of said rear holder portions includes a respective rear inner holder wall which is alignment with a respective fulcrum bump.

12. A bow holder apparatus, comprising:

a bow holder unit which includes a top holder member portion and a bottom holder member portion, wherein said top holder member portion includes a front holder portion, a middle holder portion, and a rear holder portion, and wherein said bottom holder member portion includes connector receivers, and holder-to-support interface means, received in said connector receivers, for connecting said bow holder unit to an underlying support that can be either the ground or a support panel connected to a tree stand wherein:

said holder-to-support interface means include a bolt head portion of a first connector bolt, and the underlying support includes elevated support attachment means attached to an elevated support, wherein said elevated support attachment means include:

a support panel connected to said first connector bolt, wherein said first connector bolt passes through a first bolt reception channel in said support panel, a second connector bolt threaded through a second bolt reception channel in said support panel, a clamping plate which includes a bolt reception channel through which a portion of said second connector bolt passes through, and a second nut for attachment to a threaded end of said second connector bolt.

13. The apparatus of claim 12, further including:

a first nut for connection with a threaded end of said first connector bolt for securing said support panel to said bow holder unit.

14. The apparatus of claim 12, further including:

an orientation angle adjustment wedge located between said bow holder unit and said support panel.

15. The apparatus of claim 14 wherein:

said orientation angle adjustment wedge includes an internal adjustment slot, and said first connector bolt passes through said internal adjustment slot at a selected position along said internal adjustment slot.

* * * * *